(12) United States Patent
Utter et al.

(10) Patent No.: US 7,218,209 B2
(45) Date of Patent: May 15, 2007

(54) METHOD AND APPARATUS FOR DETERMINING CORRECT TIRE PRESSURE INFLATION DURING ADJUSTMENT

(75) Inventors: Thomas E. Utter, Royal Oak, MI (US); Mark A Walters, Macomb, MI (US); John G Maxgay, Rochester Hills, MI (US); John Liddell Turner, White Lake, MI (US); Stephen C Kirsch, Sterling Hights, MI (US)

(73) Assignee: General Motors Corporation, Detroit, MI (US)

( * ) Notice: Subject to any disclaimer, the term of this patent is extended or adjusted under 35 U.S.C. 154(b) by 135 days.

(21) Appl. No.: 11/082,097

(22) Filed: Mar. 16, 2005

(65) Prior Publication Data

US 2006/0220813 A1 Oct. 5, 2006

(51) Int. Cl.
*B60C 23/00* (2006.01)
(52) U.S. Cl. ............... 340/442; 340/447; 73/146.2
(58) Field of Classification Search ........ 340/442–448; 73/146.2, 146.4; 701/29
See application file for complete search history.

(56) References Cited

U.S. PATENT DOCUMENTS

| 5,109,213 | A | * | 4/1992 | Williams | 340/447 |
| 5,699,041 | A | * | 12/1997 | Ballyns | 340/442 |
| 6,612,165 | B2 | * | 9/2003 | Juzswik et al. | 73/146.5 |
| 6,774,774 | B2 | * | 8/2004 | Schofield et al. | 340/442 |
| 2005/0199328 | A1 | * | 9/2005 | Schoenberger et al. | 152/415 |

\* cited by examiner

*Primary Examiner*—Phung T. Nguyen
(74) *Attorney, Agent, or Firm*—Lionel D. Anderson

(57) ABSTRACT

A method and apparatus are provided for determining pressure within a tire mounted to a vehicle, wherein the tire is coupled to a tire pressure monitoring system including a sensor coupled to a transmitter, the sensor configured to sense tire pressure and the transmitter configured to transmit the sensed tire pressure to a receiver. First, a first tire pressure is sensed. Then, a calculation is made as to whether the sensed first tire pressure is greater than a predetermined pressure threshold, equal to the predetermined pressure threshold, or less than the predetermined pressure threshold. Next, an indication is provided external to the vehicle that the sensed first tire pressure is greater than a predetermined pressure range, within the predetermined pressure range, or less than the predetermined pressure range.

23 Claims, 5 Drawing Sheets

METHOD AND APPARATUS FOR DETERMINING CORRECT TIRE PRESSURE INFLATION DURING ADJUSTMENT

TECHNICAL FIELD

The present invention generally relates to monitoring tire pressure in a vehicle such as an automobile, and more particularly relates to a system for determining whether a tire mounted on the vehicle is properly inflated.

BACKGROUND

To improve safety, reduce tire wear, and increase fuel economy, certain classes of motor vehicles are required or soon will be required by statute to have tire pressure monitoring systems. These systems are capable of sensing tire pressure for each tire at each location on the motor vehicle and communicating the pressure data to the driver. Typically, a pressure sensor and other associated circuitry specific to each wheel are mounted on each tire.

In order for the tire pressure monitoring system to operate correctly, the tires are typically inflated to a placard pressure value. Conventionally, a hand-held tire gauge is used to determine whether the tire is sufficiently inflated. In this regard, after the tire is inflated, the driver attaches the gauge to the tire, obtains a tire pressure measurement reading, and compares the obtained reading to a placard tire pressure value. Depending on the reading, the driver adds more air or takes air out of the tire. At times, however, the tire gauge may be faulty and/or may give inaccurate tire pressure readings inaccurate. As a result, the tires may be overinflated or underinflated. In other instances, the driver may not have knowledge or access to the placard value. In such cases, use of a tire gauge is ineffective. In yet other instances, a driver may not have a tire pressure gauge.

Accordingly, it is desirable to provide a system and a method for accurately determining whether a tire is sufficiently inflated. In addition, it is desirable to reduce the amount of hardware that is needed to determine whether the tire is sufficiently inflated. Furthermore, other desirable features and characteristics of the present invention will become apparent from the subsequent detailed description and the appended claims, taken in conjunction with the accompanying drawings and the foregoing technical field and background.

BRIEF SUMMARY

In one exemplary embodiment, a system is provided for monitoring tire pressure. The system may have a plurality of tires each mounted on a wheel at one of a plurality of locations relating to the vehicle and includes a plurality of tire pressure detectors, a receiver, and a processor. The plurality of tire pressure detectors may each be coupled to one of the plurality of wheels. Each tire pressure detector may further include a transmitter and a pressure sensor configured to detect changes in the pressure in the one tire mounted on the wheel. The receiver may be configured to receive the detected pressure changes. The processor may be coupled to the receiver and may be configured to sense a tire pressure, calculate whether the sensed tire pressure is greater than a predetermined pressure range, within the predetermined pressure range, or less than the predetermined pressure range, and cause an indication external to the vehicle to alert a vehicle operator that the sensed tire pressure is greater than a predetermined pressure range, within the predetermined pressure range, or less than the predetermined pressure range.

In other exemplary embodiments, a method and apparatus also are provided for determining pressure within a tire mounted to a vehicle, wherein the tire is coupled to a tire pressure monitoring system including a sensor coupled to a transmitter, the sensor configured to sense tire pressure and the transmitter configured to transmit the sensed tire pressure to a receiver. First, a first tire pressure is sensed. Then, a calculation is made as to whether the sensed first tire pressure is greater than a predetermined pressure range, within the predetermined pressure range, or less than the predetermined pressure range. Next, an indication is provided external to the vehicle that the sensed first tire pressure is greater than a predetermined pressure range, within the predetermined pressure range, or less than the predetermined pressure range.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
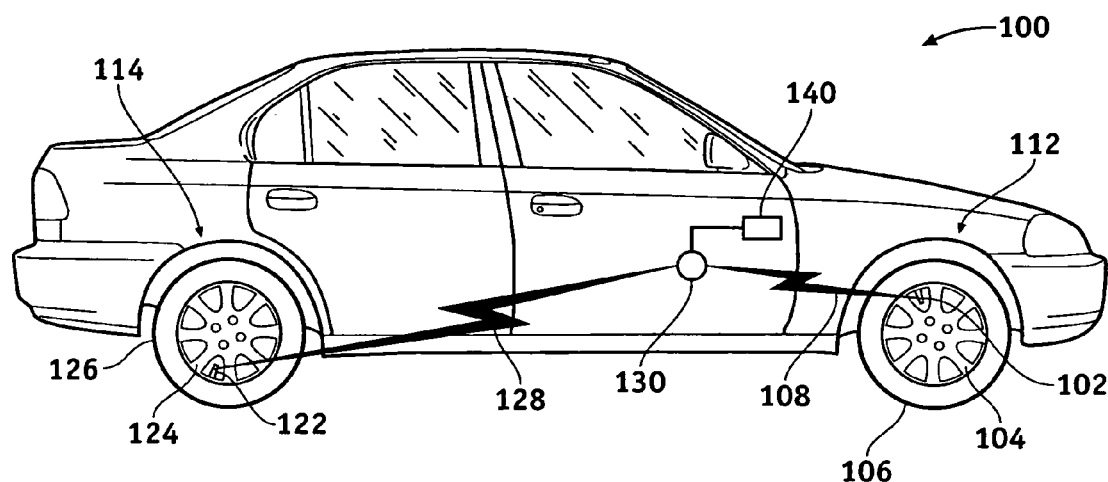
FIG. 1 is a diagram of an exemplary embodiment of a tire pressure monitoring system.

FIG. 1 shows a side elevation of exemplary motor vehicle 100 having wheel 104 with tire 106 mounted in the right front location 112 and wheel 124 with tire 126 mounted in the right rear location 114, a tire pressure monitor receiver 130, and a vehicle speed sensor 140. Each wheel 104, 124 has a tire pressure detector 102 and 122, respectively, communicating with tire pressure monitor receiver 130. Tire pressure detectors 102 and 122 may be electronic, electromechanical, or other devices coupled to a valve stem or which may replace a valve stem of wheels 104, 124. Tire pressure detectors 102, 122 suitably include one or more pressure sensors, which are any devices capable of sensing pressure in tires 106, 126 in conjunction with a transmitter, such as an RF transmitter. In embodiments adaptable to legacy tire designs, the tire pressure detectors 102 and 122 in the wheels 104 and 124 may be coupled to a tire valve stem in the conventional way. Alternatively, other configurations for tire pressure detectors 102 and 122 may be employed as well. For example, in particular embodiments, a tire pressure detector 102 may be installed through the tire wall or bead or may be manufactured into the tire wall or bead of tire 106. Tire 126 similarly has tire pressure detector 122 which may also be mounted in the same manner as tire pressure detector 102. Tires on the opposite side of the motor vehicle, not shown, are similarly configured. It will be appreciated that tires are normally filled with air, but that other gases or fluids, such as dry nitrogen or water, may be used.

Figure 2:
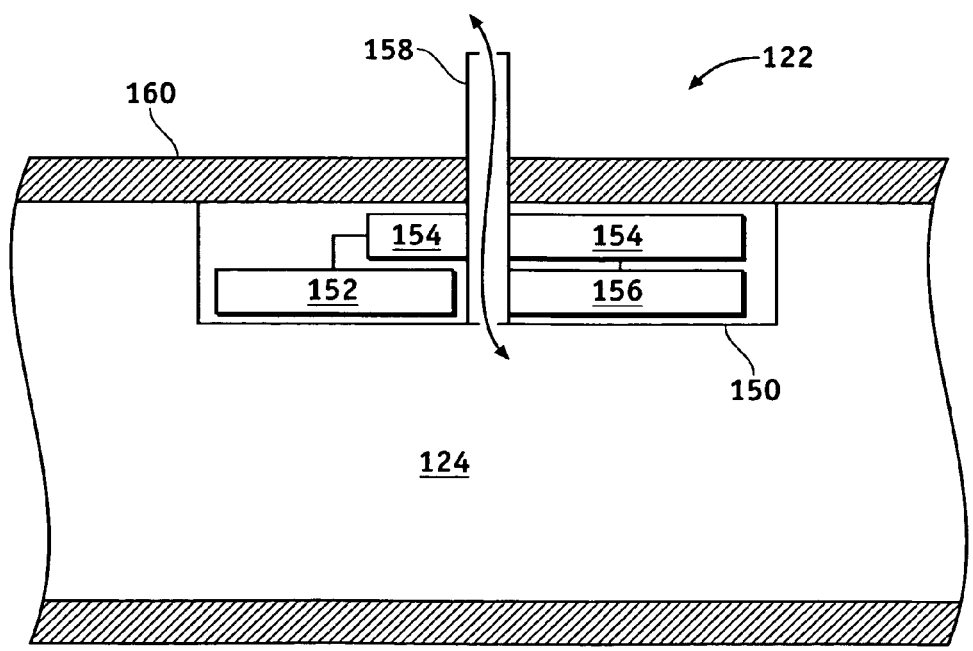
FIG. 2 is a diagram of an exemplary embodiment of a tire pressure detector.

FIG. 2 shows tire pressure detector 122 in more detail. Tire pressure detector 122 suitably includes valve stem 158 and housing 150 coupled to the valve stem 158. Valve stem 158 transfers air into and out of the tire in any conventional manner as shown by the double arrow in FIG. 2, and also may serve as an antenna. Valve stems which serve as antennas are typically made of metal. In an alternate embodiment, the valve stem may be an antenna support for a discrete antenna. Housing 150 contains, at least in part, pressure sensor 152 coupled to a processor 154 coupled to transmitter 156 coupled to valve stem 158.

Pressure sensor 152 senses the pressure in the tire and makes pressure measurement data available to processor 154. Pressure sensor 152 may be of any conventional type appropriate for the pressure range of the tire. Processor 154 controls transmitter 156, as appropriate, to transmit the sensed tire pressure periodically. For example, processor 154 may control transmitter 156 to transmit tire pressure data once every minute. Processor 154 also determines if a change in tire pressure has occurred and controls transmitter 156 to responsively transmit the unique ID number, pressure change identifier and, optionally, the tire pressure data to monitor receiver 130. A change in tire pressure could occur as a result of pumping air into tire 106 or 126 from an air hose at a filling station, releasing air from tire 106 or 126 by depressing the valve pintle in the conventional manner, or from a leak or a sudden temperature change. For example, a tire pressure change of 1.6 psi or so over a period of twenty seconds may initiate a responsive data transmission. Tire pressure change magnitudes over periods of time may be adapted for particular sizes and types of tires and tire pressures.

Transmitter 156 transmits tire pressure data and unique tire pressure detector identification codes to tire pressure monitor receiver 130 over links 108 and 128, respectively. Each tire pressure detector, including detectors 102 and 122, has a unique tire pressure detector identification code, or ID number. The code may be stored in transmitter 156, processor 154, or a memory (not shown) associated with processor 154. Association of the ID number with a particular tire location 112, 114 enables the monitor receiver 130 to know from which tire location 112, 114 the data is being received.

Figure 3:
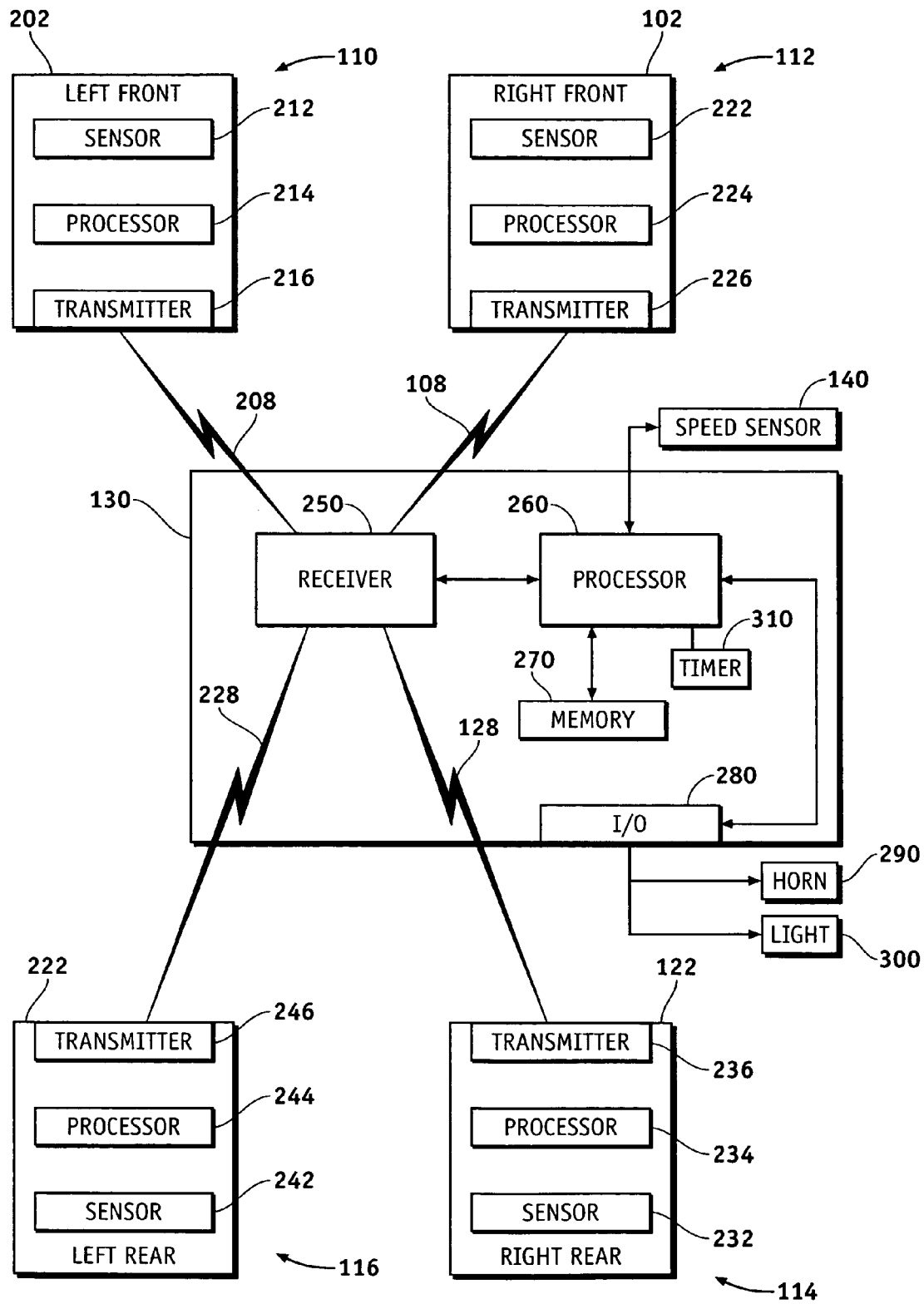
FIG. 3 is a block diagram of an exemplary embodiment of a tire pressure monitoring system.

FIG. 3 shows a block diagram of an exemplary embodiment of a tire pressure monitoring system. Tire pressure detectors 202, 102, 122, and 222 correspond to the left-front tire location 110, the right-front tire location 112, the right-rear tire location 114, and the left-rear tire location 116, respectively. Other configurations are possible for vehicles having different numbers of tires. For example, a spare tire for vehicle 100 may also have a tire pressure detector, or a tire pressure detector could be installed in each tire of a two-wheeled or 18-wheeled vehicle.

Each tire pressure detector 202, 102, 122, and 222 includes a tire pressure sensor 212, 222, 232, and 242, respectively; a processor 214, 224, 234, and 244, respectively; and a transmitter 216, 226, 236, and 246, respectively. Each tire pressure sensor 212, 222, 232, and 242 senses the air pressure in its respective tire and provides data relating to the tire pressure to the respective processor 214, 224, 234, and 244. Each processor 214, 224, 234, and 244 is configured to detect changes in tire pressure and to control the respective transmitter 216, 226, 236, and 246 to responsively transmit data and the unique identification code to receiver 250 in monitor receiver 130. The data and the unique identification code are contents of a pressure change message transmitted to monitor receiver 130.

In one exemplary embodiment, each tire pressure detector 202, 102, 122, and 222 transmits a function code that differentiates between normal periodic transmissions and transmissions caused by tire pressure changes. The rate of pressure change created by releasing air from or pumping air into the tire 126 through the valve stem 158 is sufficiently rapid to initiate transmission of a pressure change message. The significance of the rate of pressure change will become clearer further below.

Speed sensor 140 determines vehicle speed and transmits the vehicle speed data to processor 260 for evaluation. Speed sensor 140 can also have any number of configurations and utilize any number of techniques to determine the speed of the vehicle. For example, the speed of the vehicle can be determined with an accelerometer, speedometer or the like. In addition, the speed can be calculated from an operating parameter of the vehicle measured by the speed sensor 140, or calculated from multiple operating parameters of the vehicle as measured by the speed sensor 140 or one or more sensors other than the speed sensor 140. For example, the vehicle speed can be calculated from the rotational speed of a drive shaft (not illustrated) as measured by a drive shaft sensor (not illustrated) according to conventional techniques.

Monitor receiver 130 includes receiver 250, processor 260, and memory 270. The receiver 250 receives data from each tire pressure transmitter 216, 226, 236, and 246 over wireless links 208, 108, 128 and 228, respectively. In another embodiment, the receiver 250 receives vehicle speed data from the speed sensor 140. The processor 260 determines whether a tire pressure measurement and vehicle speed are above or below predetermined acceptable values. In one embodiment, the processor 260 communicates with a timer 310. Memory 270 stores predetermined tire pressure values, measured tire pressure values, and vehicle speed threshold values. Memory 270 may also be capable of storing the associations between the unique identification codes and the tire locations, enabling the processor 260 to immediately associate pressure data received from a particular transmitter 216, 226, 236, or 246 with a tire location 110, 112, 114, or 116, respectively. Monitor receiver 130 further includes one or more I/O devices 280 coupled to the processor 260 for interaction with a user or other automotive subsystems, such as a vehicle horn 290 and an external vehicle light 300.

Figure 4:
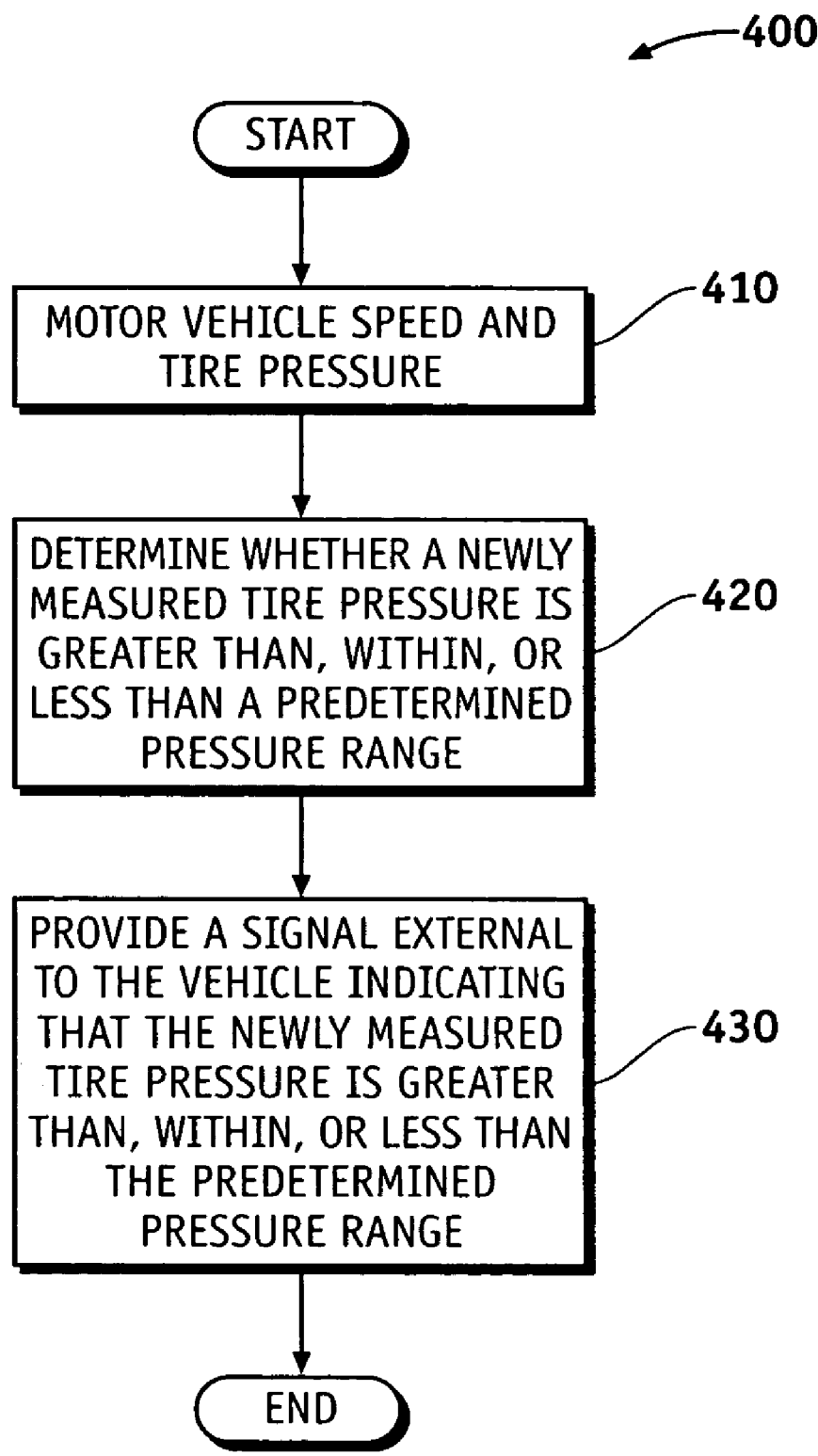
FIG. 4 is a flowchart of an exemplary embodiment of a method of a determining correct tire pressure.

FIG. 4 is a flowchart of exemplary method (400) for determining whether a tire is sufficiently inflated which may be implemented in software in processor 260 as shown in FIG. 2. In some alternate embodiments, types of logic other than software, such as firmware or hardware, may be used.

Each step of the process (400) that is depicted in the flowchart is referenced herein by the use of parentheticals. First, vehicle speed and tire pressure is monitored (410). If the vehicle speed is below a predetermined speed threshold and the tire pressure changes, then a determination is automatically made as to whether a newly measured tire pressure is greater than a predetermined pressure range, within the predetermined pressure range, or less than the predetermined pressure range (420). Lastly, a signal external to the vehicle is provided to a driver indicating that the newly measured tire pressure is greater than the predetermined pressure range, within the predetermined pressure range, or less than the predetermined pressure range (430).

As briefly mentioned above, vehicle speed and tire pressure are monitored (410). In one exemplary embodiment, speed sensor 140 senses the vehicle speed and determines whether the vehicle is stationary or rolling. A stationary vehicle may be idle or traveling at a slow speed, such as, for example, between about 0 and 5 kph, while a rolling vehicle may be traveling at any speed above the stationary speed range. In another exemplary embodiment, pressure sensors 212, 222, 232, and 242 monitor the tire pressure in order to detect a pressure change. In one embodiment, the tire pressure is measured once per a predetermined time interval to determine whether there is a change in tire pressure between each predetermined time interval.

The monitored vehicle speed and tire pressure change data may be used to automatically activate the tire pressure monitoring system. In one example, the tire pressure monitoring system is continuously operating, however, the monitored vehicle speed and tire pressure change data automatically cause the system to shift between a stationary and rolling mode and an alert and a normal mode, where tire pressure is measured more frequently during the alert mode than in the normal mode. Thus, the predetermined time interval for the alert mode is shorter than the predetermined time interval for the normal mode.

Figure 5:
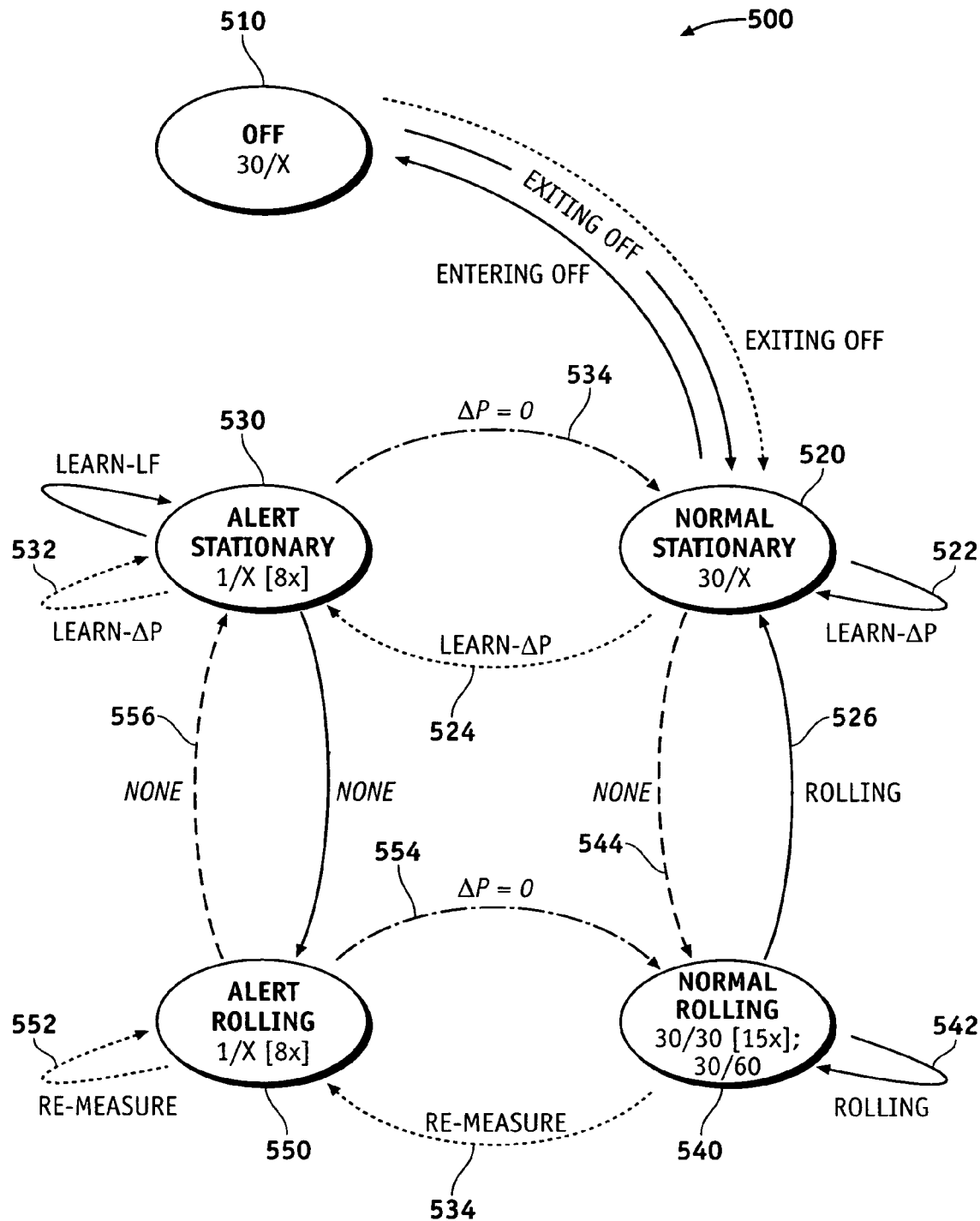
FIG. 5 is another flowchart of one of the steps in the exemplary method depicted in FIG. 4.

An exemplary embodiment is illustrated in FIG. 5, which may be implemented in any processor employed in the tire pressure monitoring system, however, more preferably, implemented in sensors 212, 222, 232, 242. In this embodiment, the predetermined time interval for the alert mode is one second, while the predetermined time interval for the normal mode is thirty seconds. Other embodiment may use widely varying time parameters.

With reference to FIG. 5, when the vehicle is off and presumably stationary (510), the system is in normal mode. The tire pressure is measured at the predetermined time interval for normal mode (e.g., every thirty seconds in this example). If the vehicle is powered on and remains stationary (520), the system remains in normal mode and continues to measure the tire pressure once every thirty seconds (522). If no pressure change is detected between each pressure measurement and the vehicle remains stationary, the system remains in normal stationary mode (520). If a pressure change is detected and the vehicle remains stationary (524), the system automatically shifts to an alert stationary mode (530).

During alert stationary mode (530), tire pressure measurements are obtained once every second. Measurements are repeated (532) until no pressure change is detected (534). The significance of this step will be discussed in further detail below. If no pressure change is detected (534), the system reverts back to normal stationary mode (520).

If, while in normal stationary mode (520), the vehicle begins to move (526), the system automatically shifts to a normal rolling mode (540). Similar to normal stationary (520), tire pressure is measured every thirty seconds. The vehicle remains in normal rolling mode as long as the vehicle speed is above stationary speed (542). If the vehicle stops and becomes stationary (544), the system reverts back to normal stationary mode (520).

If the vehicle is in normal rolling mode (540) and the system detects a pressure change (534), the system automatically shifts to an alert rolling mode (550). In alert rolling (550), the system takes a tire pressure measurement reading at the appropriate time interval for alert mode (e.g. once every second in this example) (552). The system continues to re-measure the tire pressure until no pressure change is detected (554). When no pressure change is detected, the system automatically reverts back to normal rolling mode (540). However, if pressure change is still detected and the vehicle becomes stationary (556), the system automatically shifts to alert stationary mode (530).

Figure 6:
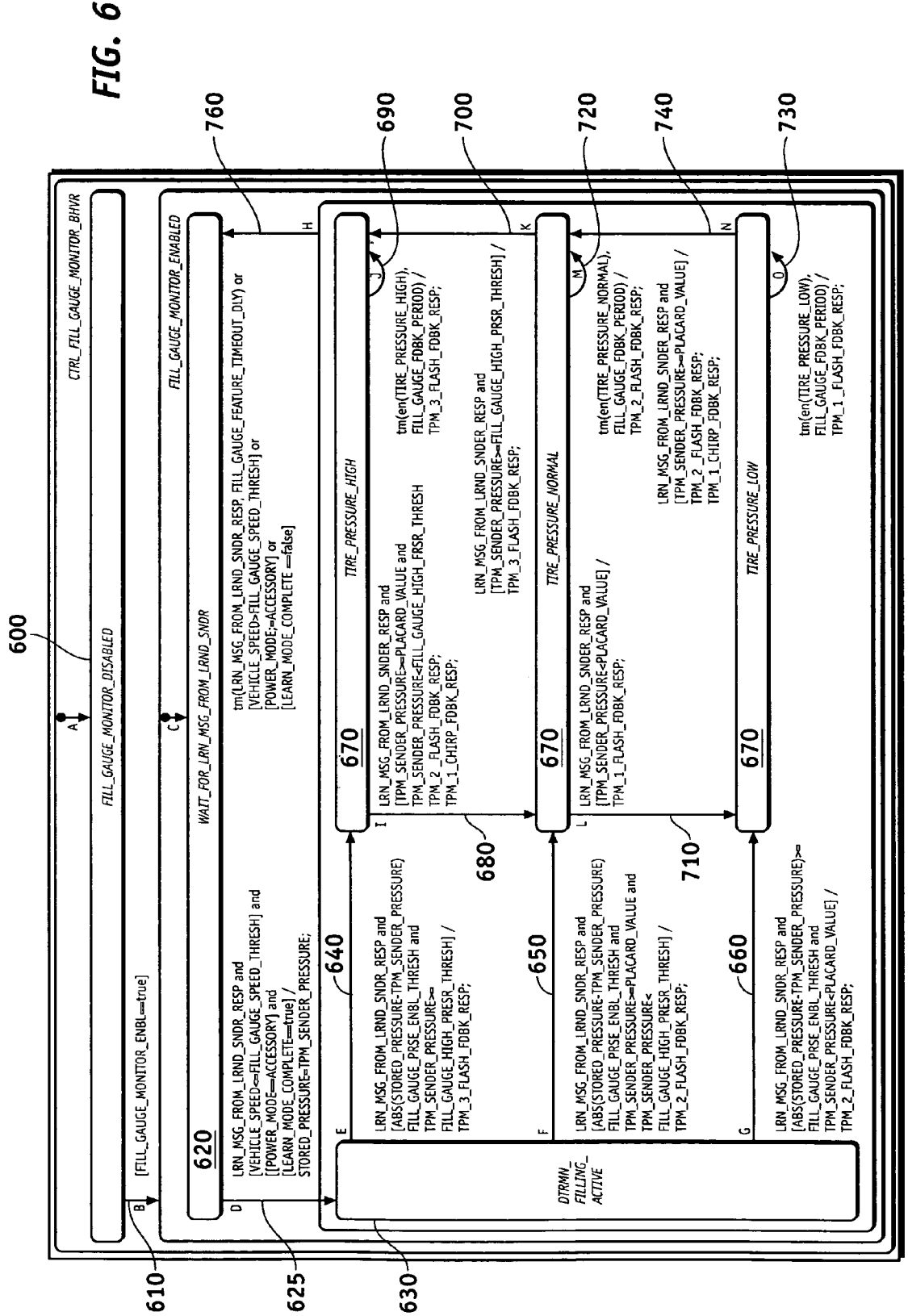
FIG. 6 is another flowchart of one of the steps in the exemplary method depicted in FIG. 4.

During alert stationary mode (520), the system can automatically begin to detect whether a tire pressure measurement is greater than a predetermined pressure range, within the predetermined pressure range, or less than the pressure range (420). This step (420) may be implemented in any one of numerous fashions, one of which is depicted in FIG. 6, and may be implemented into any of the processors used in tire pressure monitoring system, however, the step is more preferably employed in a sender, which may be one of sensors 212, 222, 232, 242 or any other device capable of communicating tire pressure data to monitor receiver 130.

Initially, monitor receiver 130 is in a disabled mode (600) until it receives a signal from sender that causes it to automatically enter an enable mode (610). The signal may be any one of numerous trigger signals, and may be based, in part, upon several factors, such as whether the vehicle speed is below a certain threshold speed, or whether the pressure change is above a predetermined pressure change threshold. After the monitor receiver 130 is enabled, it waits to receive a learn message from sender (620) that indicates whether the vehicle speed is below or equal to the predetermined speed threshold, whether the vehicle power mode is in an accessory power mode, and if sender has completed its learn mode (625). Additionally, monitor receiver 130 determines whether a stored pressure (which is the last pressure measurement that was received and that initiated the trigger signal) is equal to the pressure measurement received from the sender (625).

Next, a determination is made as to whether the tire is being inflated or deflated and whether a newly measured tire pressure should be classified as high, normal, or low in relation to a predetermined placard value (630). The predetermined placard value may be any suitable pressure value or range that allows tires to optimally operate. In one example, the determination is made by calculating a difference between the stored pressure and the newly measured tire pressure and then comparing the calculated difference to a predetermined pressure difference. The predetermined pressure difference is the pressure difference that is preferably met for the monitor receiver 130 to implement the process and may be any appropriate value. In another embodiment, the newly measured tire pressure is compared to a predetermined high pressure threshold, wherein the predetermined high pressure threshold is the pressure difference threshold that indicates the pressure is higher than desired. Thus, if the difference is greater than or equal to a predetermined pressure difference and the newly measured tire pressure is greater than or equal to a predetermined high pressure threshold, then the newly measured tire pressure is classified as high (640). If the difference is greater than or equal to the predetermined pressure difference, the newly measured tire pressure is greater than or equal to the placard value, and the newly measured tire pressure is also less than the predetermined high pressure threshold, then the newly measured tire pressure is classified as normal (650). If the difference is greater than or equal to the predetermined pressure difference and the newly measured tire pressure is less than the placard value, then the newly measured tire pressure is classified as low (660).

Returning to FIG. 4, after the classification is made, an indication external to the vehicle is provided communicating the determined classification (430). In one exemplary embodiment, the monitor receiver 130 causes either a horn to chirp or an external vehicle light to flash to indicate whether the tire pressure classification is a high, normal or low value. For instance, if the tire pressure is classified as high, the vehicle provides three quick flashes of its headlights. If the tire pressure is normal, the vehicle could provide two quick flashes, or alternatively, two quick flashes and a horn chirp. If the tire pressure is low, one flash may provided. Again, different embodiments may be use any other indication scheme.

With reference again to FIG. 6, if the driver subsequently inflates or deflates the tire, the monitor receiver 130 obtains a second tire pressure measurement and determines whether the second newly measured tire pressure is high, normal, or low in relation to the predetermined placard value (670). From a previously high value, if the monitor receiver 130 determines that the second newly measured tire pressure is greater than or equal to the placard value and the second newly measured tire pressure is less than the predetermined high pressure threshold, then the second newly measured tire pressure is classified as normal (680). Alternatively, the monitor receiver may determine that the second newly measured tire pressure is still high (690) and step (670) is repeated until step (680) is achieved.

From a previously normal value, the monitor receiver 130 determines whether the second newly measured tire pressure is higher than the predetermined high pressure threshold (700), below the placard value (710), or normal (720). If the second newly measured tire pressure is classified as high, then step (670) is repeated until (680) is achieved. From a previously low value, the monitor receiver 130 determines whether the second newly measured tire pressure is still low (730), or whether the second newly measured tire pressure is normal (740).

Similar to above, after the classification is made, an indication external to the vehicle is provided to communicate the determined classification (430).

In another exemplary embodiment, the system exits the alert stationary mode if the monitor receiver 130 learns from sender that a time measured by timer 310 coupled to the receiver 130 exceeds a predetermined time threshold, vehicle speed is greater than a predetermined speed threshold, power mode is in accessory mode or the sender has not completed learn mode (760). The predetermined time threshold may be any length of time that may provide an indication that the driver is not inflating or deflating the tire. For example, the predetermined time threshold may be between thirty and sixty seconds. As previously mentioned, the predetermined speed threshold may be any range of speed indicating a stationary vehicle, and may be, for example, between 0 and 5 kph.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for determining pressure within a tire mounted to a vehicle, the method comprising the steps of:
   sensing a pressure of the tire;
   calculating whether the sensed tire pressure is greater than a predetermined pressure range, within the predetermined pressure range, or less than the predetermined pressure range wherein the step of calculating comprises:
   determining a difference between a stored pressure and the tire pressure and comparing the determined difference to a predetermined pressure difference; and
   providing one of a first combination of audible and visual indications external to the vehicle that the tire pressure is greater than a predetermined pressure range, a second combination of audible and visual indications external to the vehicle that the tire pressure is within the predetermined pressure range, and a third combination of audible and visual indications external to the vehicle that the tire pressure is less than the predetermined pressure range, wherein each of the first, second, and third audible and visual indications are different from one another.

2. The method of claim 1, further comprising:
   measuring the tire pressure during a first predetermined time interval;
   measuring a second tire pressure during a second predetermined time interval; and
   determining a change in the tire pressures of the first and the second predetermined time intervals.

3. The method of claim 2, wherein the step of determining a change comprises:
   measuring a speed of the vehicle;
   detecting whether the speed is less than a predetermined speed threshold; and
   if the speed is less than the predetermined speed threshold and if the change is greater than a predetermined change threshold, automatically measuring a third pressure of the tire during a third predetermined time interval.

4. The method of claim 1, further comprising:
   measuring the tire pressure at a first time instant;
   measuring a pressure of the tire at a second time instant after the first time instant;
   determining a differential between the second time instant tire pressure and the first time instant tire pressure; and
   measuring a third pressure of the tire at a third time instant, if the differential is greater than zero.

5. The method of claim 1, wherein the step of calculating further comprises:
   comparing the tire pressure to a predetermined high pressure threshold, wherein the predetermined high pressure threshold is a pressure difference threshold that indicates a high pressure.

6. The method of claim 5, wherein the step of calculating further comprises:
   classifying the tire pressure as high, if the determined difference is greater than or equal to the predetermined pressure difference and the tire pressure is greater than or equal to the predetermined high pressure threshold.

7. The method of claim 6, wherein the step of calculating further comprises:
   classifying the tire pressure as normal, if the determined difference is greater than or equal to the predetermined pressure difference, the tire pressure is greater than or equal to a placard value, and the tire pressure is less than the predetermined high pressure threshold.

8. The method of claim 7, wherein the step of calculating further comprises:
   classifying the tire pressure as low, if the determined difference is greater than or equal to the predetermined pressure difference and the tire pressure is less than the placard value.

9. The method of claim 1, further comprising:
   determining whether the vehicle is in accessory power mode;
   sensing a second pressure of the tire;
   determining a change between the second tire pressure and the first tire pressure and if the change in tire pressure is greater than a predetermined pressure change.

10. The method of claim 1, further comprising terminating the method if a speed of the vehicle is greater than a predetermined speed threshold.

11. The method of claim 1, further comprising terminating the method if a timer indicates that a predetermined threshold of time has expired.

12. A method for determining pressure within a tire mounted to a vehicle, the method comprising the steps of:
   measuring a first pressure of the tire during a first predetermined time interval;
   measuring a second pressure of the tire during a second predetermined time interval having a duration that is substantially equal to the first predetermined time interval;
   determining a pressure change between the first and second tire pressures and detecting whether a speed of the vehicle is less than a predetermined speed threshold;
   if the vehicle speed is less than the predetermined speed threshold and the pressure change is greater than a predetermined change threshold, automatically sensing a third pressure of the tire during a third predetermined time interval, wherein the third predetermined time interval is shorter in duration than the first predetermined time interval;
   calculating whether the third tire pressure is greater than a predetermined pressure range, within the predetermined pressure range, or less than the predetermined pressure range; and
   providing one of a first combination of audible and visual indications external to the vehicle if the third tire pressure is greater than a predetermined pressure range, a second combination of audible and visual indications external to the vehicle if the third tire pressure is within to the predetermined pressure range, and a third combination of audible and visual indications external to the vehicle if the third tire pressure is less than the predetermined pressure range, wherein each of the first, second, and third audible and visual indications are different.

13. The method of claim 12, wherein the step of calculating further comprises:
   determining a difference between a stored pressure and the first tire pressure and comparing the determined difference to a predetermined pressure difference.

14. The method of claim 13, wherein the step of calculating further comprises:
   comparing the first tire pressure to a predetermined high pressure threshold, wherein the predetermined high pressure threshold is a pressure difference threshold that indicates a high pressure.

15. The method of claim 14, wherein the step of calculating further comprises:
   classifying the first tire pressure as high, if the determined difference is greater than or equal to the predetermined pressure difference and the first tire pressure is greater than or equal to the predetermined high pressure threshold.

16. The method of claim 15, wherein the step of calculating further comprises:
   classifying the first tire pressure as normal, if the determined difference is greater than or equal to the predetermined pressure difference, the first tire pressure is greater than or equal to a placard value, and the first tire pressure is less than the predetermined high pressure threshold.

17. The method of claim 16, wherein the step of calculating further comprises:
   classifying the first tire pressure as low, if the determined difference is greater than or equal to the predetermined pressure difference and the first tire pressure is less than the placard value.

18. The method of claim 12, further comprising detecting whether the vehicle is in a particular operating mode and if the pressure change is greater than a predetermined pressure threshold.

19. The method of claim 12, further comprising terminating the method if the vehicle speed is greater than the predetermined speed threshold.

20. The method of claim 12, further comprising terminating the method if a timer indicates that a predetermined threshold of time has expired.

21. A tire pressure monitor system for a vehicle having a plurality of tires each mounted on a wheel at one of a plurality of locations relating to the vehicle, the tire pressure monitor system comprising:
   a plurality of tire pressure detectors each coupled to one of the plurality of wheels, each tire pressure detector further comprising:
      a transmitter; and
      a pressure sensor coupled to the transmitter and configured to detect changes in the pressure in the one tire mounted on the wheel;
   a receiver in communication with each of the tire pressure detectors of the plurality of tire pressure detectors and configured to receive the detected pressure changes;
   a processor coupled to the receiver, wherein the processor is configured to:
   measure a first tire pressure during a first predetermined time interval and measure a second tire pressure during a second predetermined time interval that is substantially equal in duration to the first predetermined time interval;
   calculate a pressure change between the first and the second tire pressures and detect whether a speed of the vehicle is less than a predetermined speed threshold;
   if the vehicle speed is less than the predetermined speed threshold and if the pressure change is greater than the predetermined change threshold, sense a third tire pressure during a third predetermined time interval, wherein the third predetermined time interval is smaller than the first predetermined time interval;
   determine whether the third tire pressure is greater than a predetermined pressure range, within the predetermined pressure range, or less than the predetermined pressure range; and cause one of a first audible and visual indications external to the vehicle to indicate that the third tire pressure is greater than a predetermined pressure range, a second audible and visual indications external to the vehicle that the third tire pressure within to the predetermined pressure range, and a third audible and visual indications external to the vehicle that the third tire pressure less than the predetermined pressure range, wherein each of the first, second, and third audible and visual indications are different.

22. The system of claim 21, further comprising a light coupled to the processor, wherein the processor is further configured to cause the light to indicate to the vehicle operator that the third tire pressure is greater than a predetermined pressure range, within the predetermined pressure range, or less than the predetermined pressure range.

23. The system of claim 21, further comprising an audible notification device coupled to the processor, wherein the processor is configured to cause the audible notification device to indicate to the vehicle operator that the third tire pressure is greater than a predetermined pressure range, within the predetermined pressure range, or less than the predetermined pressure range.

* * * * *